Sept. 29, 1959         S. L. RUSKIN         2,906,680
PROCESS FOR RECOVERY OF PETROLEUM
Filed Feb. 10, 1956

Fig. 1.

Fig. 2.

INVENTOR
SIMON L. RUSKIN,
BY
ATTORNEYS

United States Patent Office 2,906,680
Patented Sept. 29, 1959

2,906,680
PROCESS FOR RECOVERY OF PETROLEUM

Simon L. Ruskin, New York, N.Y., assignor to Union Carbide Corporation, New York, N.Y., a corporation of New York Application February 10, 1956, Serial No. 564,790

1 Claim. (Cl. 204—162)

My invention relates to the process of improving the recovery of petroleum from sedimentary rock, shale and petroleum bearing sands and other natural petroleum bearing compositions.

In my earlier filed applications, Serial No. 469,550, filed November 17, 1954, Promotion of Chemical Reactions; Serial No. 499,203, filed April 4, 1955, Process for Treatment of Petroleum; Serial No. 525,085, filed July 28, 1955, Catalytic Conversion of Petroleum; Serial No. 512,580, filed June 1, 1955, Process for Treatment of Reservoir Gases, I pointed out that electronic and ionic influences exerted by gamma radiation profoundly affected petroleum and reservoir gases leading to the formation of new products of reaction of petroleum and gaseous hydrocarbons. I have found that the carrying out of these reactions in the oil-bearing natural compositions in the earth by gamma radiation in the range of 100 million R. to 400 million R. not only promotes the formation of new and valuable hydrocarbon products but markedly increases the flow of petroleum from the rock compositions. Thus a sample of steel gray oil-bearing rock, having the appearance of dry concrete and extremely hard in composition, from which earth formation no petroleum could be made to flow, after irradiation with 100 million R. changed in color to a brownish shade and readily crumbled in the hand under moderate pressure, releasing the trapped oil which could be taken up with absorbent paper.

The petroleum globules are molecularly bound by long range weak forces to the crystal lattice structure of the silicate carbonate framework and still further held by polar attraction of connate water. By my gamma irradiation of 100 million R. to 400 million R. these long range forces are disturbed and the very lattice structure of the silicates and carbonates is altered freeing the bound petroleum. A still further factor is the change in viscosity of the petroleum creating a readier flow out of the bound composition of the rock or shale.

While my irradiation with 100 million R. to 400 million R. or more promotes primary oil flow, the degree of resultant disintegration of the silicate-carbonate structure promotes also secondary oil recovery from wells that have either ceased production or diminished production to less profitable levels. Where commonly used secondary methods are to be employed such as sand fracking, flooding, solvents or gas pressure, the preliminary use of my irradiation greatly enhances the results from such procedures. Where shale is to be treated with solvent extraction, the use of my irradiation with 100 million R. to 400 million R. reduces the amount of extractives needed and leads to enough extrusion of oil from the sand to make possible the recovery by water washing. Thus a column of treated Athabasca sand irradiated with 100 million R. to 400 million R. in a column similar to the commonly used resin columns, is flooded with water under pressure of 100 lbs. to 1000 lbs., leading to the separation of the petroleum from the sand or shale matrix.

In the case of oil wells that have long been unproductive, my irradiation sources may be kept in the wells for long periods of time, practically as a warehouse for these sources. These very wells can then again become producers since usually there may be from twenty to sixty percent of the original content of oil still present bound in the rock.

Where oil-bearing strata are reached by drilling and oil flow does not start, it is possible by my irradiation with 100 million R. to 400 million R. to induce the onset of flow. This creates a condition of capillary attraction which may extend progressively throughout the field and thus make a producing well where hitherto no production would have followed and the well would have been considered a dry hole.

Thus by my irradiation with 100 million R. to 400 million R., I am able to alter the structural properties of the oil-bearing rock and to cause the release of trapped petroleum, simultaneously facilitating the promotion of chemical reactions of the petroleum. At the same time the softening of the rocky compositions promotes the release of reservoir gases, further facilitating the promotion of gas pressure and increasing the flow of petroleum.

To carry out my procedure, I encase a source of gamma radiation in a specially constructed canister so arranged that the radiation source is completely shielded. The dimensions of the canister are such as not to exceed the dimensions of the average oil well pipe. The radiation source is permanently fixed in the canister bottom while the shielding cylinder around the canister is readily separable from the canister. Thus the radiation source may be lowered into the well for the desired period and then reshielded before removal. The source and canister are housed within a lead cylinder so that the movements of the canister and source are at no time exposed to possible contact.

As a radiation source I may use a radioactive isotope such as cobalt 60 or I may employ a hermetically sealed quantity of radioactive isotope wastes shielded so as to allow essentially only gamma radiation and protected against possible leakage. Thus wastes from the atomic reactor may be conveniently employed for my purpose. I prefer to use at least 1000 curies as a source for a single well although I may employ up to 10,000 curies when using atomic waste sources.

My radiation source may be allowed to remain in position long enough to deliver 100 million R. and then progressively shifted to various strata of the oil-bearing rock. Where catalytic petroleum reactions are desired, the well may be flooded with aqueous suspensions of the catalyst and the radiation conducted as described. Similarly, catalytic reactions of reservoir gases or pure gases can be carried out in the well to improve the quality of the petroleum under entirely safe conditions. Thus acetylene under pressure may be safely polymerized and converted by my irradiation within the oil well into various aromatic compounds, thus enriching the petroleum, and if desired the aromatic fraction may be subsequently redistilled from the petroleum. Thus the oil well may itself serve as a uniquely safe reaction chamber for catalytic conversions and polymerizations of gases, particularly acetylene.

In the drawings:

Fig. 1 shows in cross-section a shielded radiation source according to the invention; and Fig. 2 is a top plan view thereof.

The part intended to be lowered into the well includes a canister or cylindrical casing 2 in each end of which is secured a block 4 of lead or other shielding material. Between the lead blocks is a source 6 of gamma radiation, such as cobalt 60. In the upper lead block is secured a staple 8 by which a chain or cable can be secured to the canister.

The canister occupies the center of a lead cylinder 10. Within this cylinder may be a coil 12 for passage of a regulating fluid. This block can rest on a well pipe 14 so as to allow the canister to be lowered into and pulled out of the well without exposing the operator to the radioactive material. The cylinder 10 can be handled by projections 16.

Staple 8 has notches 18 in its legs, into which can engage parts 20 of a lever 22 pivoted at 24 on the top of the cylinder 10, and swingable between the solid and broken line positions shown in Fig. 2, being limited in the latter position by stop 26. In this latter position, canister 2 is free to move downward, but cannot move upward because lever 22 still overlies it. In the solid line position, in which lever 22 can be releasably held by removable bolt 28, parts 20 engaged in notches 18 support the canister within the shielding cylinder 10.

To further promote the effects of my irradiation of the oil-bearing strata, I may cause an intermediate chemical reaction to occur as a result of my irradiation with 100 million R. to 400 million R. whereby the products of the chemical reaction affect the flow of petroleum and/or the composition of the oil-bearing rock, shale or sands. Such a chemical reaction I produce with glycerol. By my irradiation with 100 million R. to 400 million R. in the presence of glycerol, the glycerol is converted to acrolein, glyceraldehyde, glyceric acid and further breakdown products. This leads to a softening of the silicate structure of the oil-bearing rock, shale or sand and an aggregation of the petroleum molecules facilitating the flow of petroleum in strata having nonproducing oil wells. Thus when a limestone core from a nonproducing oil well is immersed in glycerol and irradiated with 100 million R. to 400 million R. or more, the white or gray color of the limestone darkens perceptibly. The limestone tends to disintegrate and soften and is more easily fractured. When Athabasca sand is so treated, the petroleum separates from the sand and discolors the conversion products of the glycerol. Agitation of the sands promotes the separation of the petroleum.

Instead of glycerol, I may use the glycerol derivations such as nitroglycerine, halogenated glycerine derivations or compounds such as various glycols and alkyl glycols such as diethylene glycol glycerol chlorhydrins.

Instead of glycols, I may use various sugars, particularly molasses, furfural or furfural derivations.

Or I may use various benzene derivations such as nitrobenzine whereby refining of the petroleum in the area of irradiation is accomplished. Or I may employ various phenols or cresols as a chemical medium for my irradiation with 200 million R. to 400 million R.

Instead of conducting my irradiation with 100 million R. to 400 million R. or more in the presence of my chemical solutions, I may employ various gases such as acetylene, ethylene, propylene, butylene or methane, ethane, propane, butane or natural gas or mixtures thereof either at atmospheric pressure or increased pressure up to 1000 p.s.i.

*Example I*

A light colored 8 inch core from an oil well that has ceased producing oil was immersed in glycerol and irradiated with 200 million R. The core darkened in color and developed a strong odor of petroleum. The compression test gave the following results:

| Cores | No. 1 light, control | No. 2 dark, 200 million R. |
|---|---|---|
| Capping material | Sulphur | Sulphur |
| Height after capping | 2.437 | 2.437 |
| Diameter (in.) | 2.437 | 2.437 |
| H/O | 1 | 1 |
| Correction factor | .85 | .85 |
| Area (in.) | 4.66 | 4.66 |
| Total load | 7,260 | 5,820 |
| P.s.i. | 1,558 | 1,250 |
| Corrected p.s.i. | 1,325 | 1,064 |

The glycerol became syrupy and the presence of acrolein and glyceraldehyde could be readily detected. The glycerol also appeared to have polymerized.

*Example II*

A three inch limestone core was irradiated with 100 million R. while immersed in water. The core darkened in color and became granular with an increased odor of petroleum.

*Example III*

A 3 inch limestone core was irradiated with 100 million R. in the presence of an atmosphere of acetylene. A marked increase in darkening and odor of petroleum developed. The core could be readily crushed by the hand at the edges.

*Example IV*

A 3 inch limestone core was irradiated with 200 million R. in the presence of phenol. The core darkened and fragments could readily be crushed.

*Example V*

Five hundred grams of Athabasca oil-bearing sand were suspended in 500 cc. glycerol and irradiated with 400 million R. The glycerol darkened and the fluid volume increased to 580 cc.

*Example VI*

Five hundred grams of Athabasca oil-bearing sand were suspended in water and irradiated with 200 million R. A layer of oil separated which measured 42 cc.

While I have described herein some embodiments of my invention. I wish it to be understood that I do not intend to limit myself thereby except within the scope of the claim hereto or hereinafter appended.

What I claim is:

A process for removing petroleum from petroleum-bearing sands which comprises irradiating said petroleum-bearing sands with from 100 million to 400 million Roentgens and recovering the irradiated petroleum released from said sands.

References Cited in the file of this patent

UNITED STATES PATENTS

| | | |
|---|---|---|
| 1,627,938 | Tingley | May 10, 1927 |
| 1,897,617 | Mekler | Feb. 14, 1933 |
| 1,961,493 | Hillis | June 5, 1934 |
| 2,350,330 | Remy | June 6, 1944 |
| 2,684,447 | Gilks | July 20, 1954 |
| 2,700,111 | Jacobs et al. | Jan. 18, 1955 |
| 2,710,925 | McKay | June 14, 1955 |
| 2,743,223 | McClinton et al. | Apr. 24, 1956 |